Dec. 26, 1967     E. WILDHABER     3,359,820
WORM AND WORMGEAR REDUCTION DRIVE
Filed Oct. 18, 1965     2 Sheets-Sheet 1

INVENTOR:
Ernest Wildhaber

Dec. 26, 1967      E. WILDHABER      3,359,820
WORM AND WORMGEAR REDUCTION DRIVE
Filed Oct. 18, 1965      2 Sheets-Sheet 2
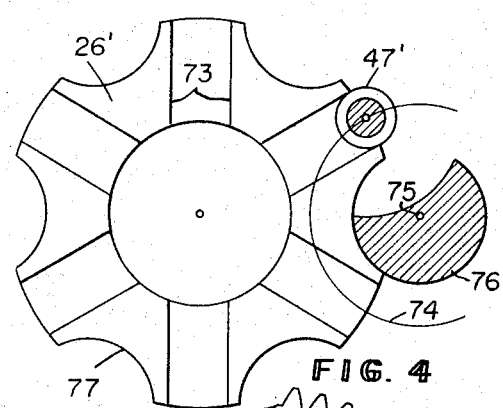
FIG. 4
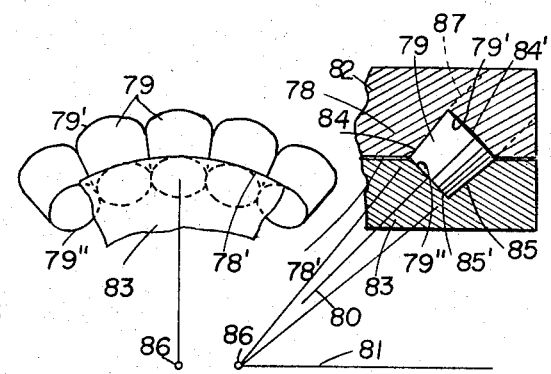
FIG. 6     FIG. 5
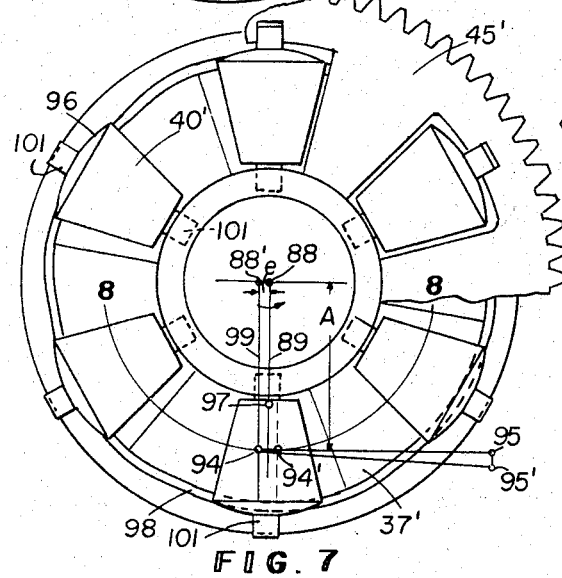
FIG. 7
FIG. 8
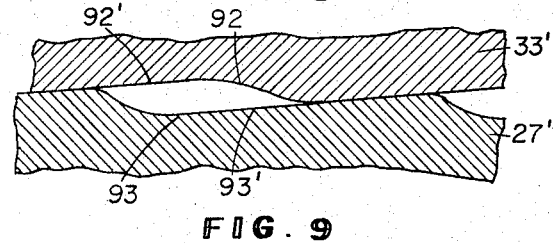
FIG. 9
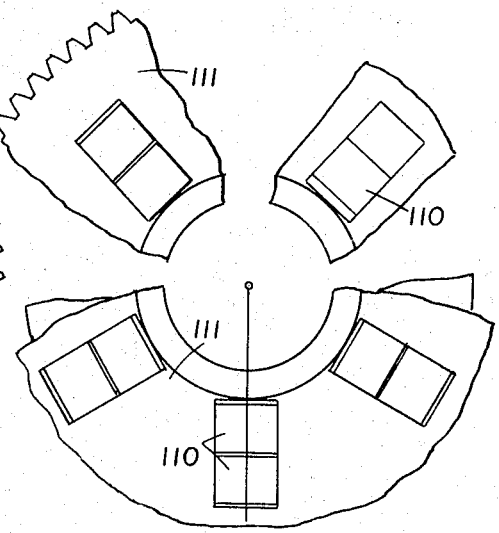
FIG. 11
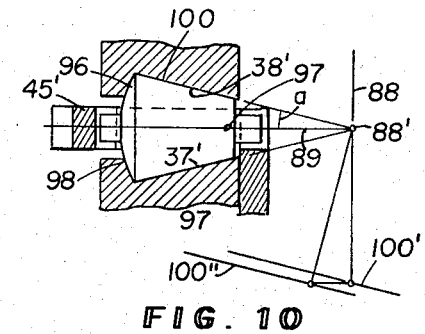
FIG. 10
INVENTOR:
Ernest Wildhaber

United States Patent Office 3,359,820
Patented Dec. 26, 1967

3,359,820
WORM AND WORMGEAR REDUCTION DRIVE
Ernest Wildhaber, Brighton, N.Y.
(124 Summit Drive, Rochester, N.Y. 14620)
Filed Oct. 18, 1965, Ser. No. 497,108
11 Claims. (Cl. 74—426)

ABSTRACT OF THE DISCLOSURE

Two axially-reciprocable threaded members drive the same part in the same direction alternately. On their working strokes they are angularly stationary; on their return strokes, they are rotatably indexed. Each member is reciprocated by a coaxial rotary element that is axially fixed and that has undulatory surfaces at opposite sides confronting undulatory surfaces rigid with a part axially fixed to the member but rotatable relative thereto. Rollers between one pair of confronting undulatory surfaces transmit the working motions; the other pair are in frictional contact. Both indexing and reciprocation are in opposite phase so that the members drive alternately.

---

The present invention relates to reduction drives wherein a driven member receives motion from a plurality of parts acting at different intervals. Particularly it relates to drives where these parts contain each a helical thread, external or internal, and are reciprocated axially of said thread, driving while moving in one direction and idling in the return stroke.

One object of the invention is to simplify the design of such drives. A further object is to take advantage of the fact that in many applications the load is principally in one direction, and to provide an antifriction drive for this load direction and a simple drive with sliding contact in the opposite direction. A further aim is to improve the rolling action in the antifriction drive, thereby increasing also its durability and strength.

A still other object is to broaden the use of such drives, and to apply the drive also to angular motion of the driven member, which then turns about an axis, in addition to applying it to straight-line motion.

Other objects will appear in the course of the specification and in the recital of the appended claims.

The invention will be described in connection with the accompanying drawings, in which FIG. 1 is an axial section of a pair of part assemblies driving a large wormgear, illustrating one embodiment of the invention.

FIGS. 4 to 11 show details of both embodiments, at a larger scale.

FIG. 4 is an end view taken along the axis of a Geneva index plate, and a cross-section of its actuator.

FIG. 5 is a fragmentary axial section of a novel type of thrust bearing, as used in said embodiments.

FIG. 6 is a fragmentary view of its conical rollers and inner race taken along the bearing axis.

FIG. 7 is a view taken along the axis of a rotary element having wavy raceways on one side for effecting reciprocation along said axis, showing also the rollers engaging said raceways and a portion of a cage member.

FIG. 8 is a development to a plane of a mean cylindrical section taken along lines 8—8 of FIG. 7, showing also the opposite member that engages said rollers.

FIG. 9 is a development of a cylindrical section similar to FIG. 8, but without rollers, showing a rotary element and an angularly stationary member engaged in sliding contact, for effecting the same kind of reciprocation as obtained with the disposition of FIG. 8.

FIG. 10 is a fragmentary axial section corresponding to FIGS. 7 and 8, and a side view of a roller.

FIG. 11 is a view similar to FIG. 7 but showing cylindrical rollers, illustrating a modified design of the antifriction drive.

Figures 1, 2, 3:
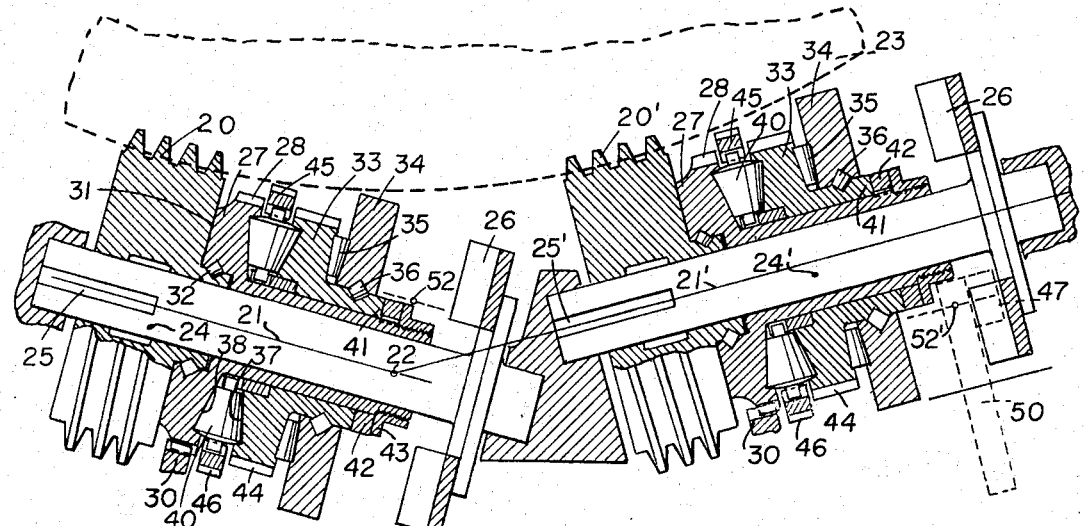
FIG. 2 is a view of the arrangement of the shafts in this embodiment, looking down along the drawing plane of FIG. 1.
FIG. 3 is an axial section of a pair of part assemblies arranged to displace a screw axially and a side view of their driving shaft, illustrating another embodiment.

Referring first to FIGS. 1 and 2, the identical worms 20, 20' are mounted to turn on angularly disposed and intersecting axes 21, 21' that intersect at 22. They mesh with the same wormgear 23 indicated in dotted lines.

Each worm is slidably keyed or splined to a shaft 24, 24' respectively, as by means of a key secured to the worm and engaging a key way 25 or 25'. The shafts 24, 24' are axially fixed. Each contains a Geneva type plate 26 rigid with it, either rigidly secured thereto or formed integral with it, see also FIG. 4.

Each worm 20, 20' rests on a member 27 that partakes in its motion along the worm axis while maintained angularly stationary. It contains axially directed straight teeth 28 that engage straight teeth provided on a stationary portion 30. Thus even if it moves axially it does not turn. The worms and their respective members 27 are kept together axially in one direction by their contact at plane sides 31, and in the opposite direction by thrust bearings 32 of a kind further shown in FIGS. 5 and 6.

Axial reciprocation of each worm is effected by a rotary element 33 that is maintained in a fixed position axially of the worm. It contacts a stationary ring 34 in one direction through a roller thrust bearing 35, and in the opposite direction through a roller bearing 36 similar to bearing 32. Element 33 contains an undulatory or wavy side surface 37 that engages a similar wavy side surface 38 of member 27 through a set of rollers 40.

The end 41 of element 33 also has an undulatory or wavy side surface, that directly and slidingly engages an undulatory or wavy side surface provided on a ring 42. Ring 42 is keyed to the hub end of member 27 and is secured by a nut 43 threaded onto the end of the hub. These contacts are further shown in FIGS. 7 and 10.

Gear teeth 44 are provided on the outside of element 33. As it is rotated thereby it reciprocates member 27 axially of the worm. The rollers 40 are maintained in the required rolling position by a cage member 45 that contains gear teeth 46. It is driven at half the rotational speed of element 33.

The effected reciprocation depends on the shape of the wavy side surfaces. It is at a uniform rate through the greater part of the stroke in one direction, in direct proportion to the turning motion of element 33 and of the rotary driver to be further described. This is the working stroke. It takes place while the worm and its shaft are angularly stationary and do not turn. They are indexed during the return stroke. Indexing is effected by an eccentric roller or pin 47 mounted on a shaft 48, 48' parallel to the respective shaft 24, 24', (FIG. 2). Roller 47 and the axis of shaft 48' are shown in FIG. 1 after having been turned into the drawing plane, the roller being shown in dotted lines.

Shafts 48, 48' are equally offset from the drawing plane of FIG. 1, in such a way that the centers 52, 52' of the disks 50 are on the same horizontal level in FIG. 1. The disks 50 support the respective rollers 47 and are provided with gear teeth 51, (FIG. 2). These engage a pair of spaced pinions 53, 53' rigid with a shaft 54. This shaft receives motion in any suitable known way and can be considered the rotary driver.

The shafts 48, 48' also contain pinions 55, 56 and 55', 56' respectively, that mesh with the teeth provided on the elements 33 and cage members 45 respectively.

The elements 33 of the two worm assemblies are timed to operate at opposite phase, as are also the index disks 50. The middle of the indexing motion of each worm corresponds to the middle of the working stroke of the other worm. Thus the worms 20, 20' alternately drive the wormgear 23, with some overlap at change-over.

As will be further described with FIGS. 7 to 10 the load is released from each worm during indexing and during the entire return stroke. As the worm turns during the indexing period, its thread slides through the wormgear teeth at zero load, so that no heat is generated and no wear occurs. The wormgear is turned under load only by the axial worm displacements, at high efficiency.

It should also be noted that the same parts are used with each worm, one set of parts reaching beyond the intersection 22 of the worm axes.

Modification

FIG. 3 illustrates another embodiment. Here the driven member is a long screw 59 that is movable along its axis but does not turn. It may be provided with a keyway (not visible) engaged by a stationary key. The parts having helical threads are here a pair of internally threaded nuts 60, 60' instead of the worms of the first described embodiment. The nuts engage the thread of screw 59. Each nut rests on a member 64 that partakes in its bodily motion axially of screw 59 but is maintained angularly stationary. The nut and member 64 are kept together in one direction axially by contact at their plane sides 65, and in the opposite direction by a thrust bearing 66 like bearing 32, formed on a hub portion of the nut. A key 67 is secured internally to member 64 and its hub portion 64'. It engages a keyway provided in screw 59. Member 64 is thereby kept angularly stationary, like the screw.

Axial reciprocation of member 64 and its nuts is effected by a rotary element 68 in the same manner as that of member 27 is effected by element 33. Indeed it is possible to use the same parts. Thrust bearings 35, 36 keep element 68 in a fixed axial position, ring 34 being fixed. Element 68 contains a wavy side surface 37 that engages wavy side surface 38 through rollers 40 held by cage member 45. End 41 of element 68 also has a wavy side surface that slidingly engages the wavy side surface provided on a ring 42 rigidly secured to hub portion 64'. Element 68 and cage member 45 have gear teeth 44 and 46 respectively. They are driven by pinions 155, 156 and 155', 156' respectively, of a shaft 70 that extends parallel to screw 59. Shaft 70 also contains the index members 71 with rollers or pins 72. It may be built up of two or more parts, if desired, and can be considered the rotary driver.

Known extra deep Geneva ways 73 are formed at the ends of the nuts 60, 60', to be engaged by amply long rollers or pins 72.

Again, the cage member 45 is driven at half the number of turns as element 68. The same described reciprocating motion is effected, that contains a uniform-motion portion in the working stroke.

In applications where large loads have to be lifted and lowered the main load is in one direction only. It is moved through rollers 40 held by thrust bearing 35. Thus the loads can be lifted at high efficiency. The provided simple sliding contact on the opposite side is quite sufficient for exerting whatever small load may be required in the opposite direction.

It should also be noted that the surfaces for operating in both directions are rigid with the same member.

Details

The Geneva plates 26' (FIG. 4) contains ways or slots 73 intermittently engaged by a roller 47'. The roller is shown in a position entering a slot 73, as it moves in a circular path 74 about the axis 75 of its shaft. A crescent shaped shaft portion 76 engages one of the matching recesses 77 provided on the outside of plate 26 and locks the plate when the roller 47' is out of engagement with the plate.

If desired known additional locking means may be provided.

In the embodiment of FIG. 3 the Geneva plate that is part of a nut 60, 60' reciprocates moderately along its axis as it turns. Here deeper slots 73 and longer rollers are used, so that engagement is maintained during operation.

A bearing 78 capable of taking axial thrust will now be described with FIGS. 5 and 6. Its structure also describes the structure of bearings 32, 36, 66. It permits, in combination with a conventional thrust bearing, rotatably holding a member in both axial directions without requiring an attached part. Nor does it need a cage and is used here without cage, the rollers filling the entire circumference.

It comprises a set of conical rollers 79 whose roller axes 80 include an angle of approximately 45 degrees with the bearing axis 81, and whose common apex lies at 86 on axis 81. It further comprises an outer race 82 and an inner race 83, having conical working sides 84, 85 respectively. Conical side 85' of the inner race forms a V-shaped profile with the workingside 85. Side 84' of the outer race is shown as a spherical surface centered at apex 86. It contacts the spherical ends of the rollers 79. Broadly side 84' is a surface of revolution about the bearing axis, whose profile inclination to the direction of the bearing axis is at least as large as that of the shown spherical surface. It may be moderately larger. The rollers securely and efficiently hold the races in one axial direction. Note that the outer and inner end circles 79', 79" of the rollers are approximately tangent to the common cylindrical surface 78' along which the outer race contacts or nearly contacts the inner race.

The rollers may be filled in through a slot 87 which clears the conical working sides 84, 85. It is closed after filling.

The reciprocation means will now be further described with FIGS. 7 to 10.

A plurality of tapered rollers 40' are set in a circle about an axis 88, with their axes 89 intersecting axis 88. They are engaged by the identical wavy side surfaces 37', 38' of a rotary element 33' and of an angularly stationary member 27'. There are as many waves on each side surface as there are rollers.

The relative motion is the same if the roller axes were fixed. If so and the rollers would turn clockwise like arrow 90, element 33' would move to the left in FIG. 8 and member 27' would move to the right. They would also move equally in opposite axial directions. The motion is best analyzed with the relative path 91 of the roller axes 89.

Actually, rotary element 33' is axially fixed and member 27' is maintained in a fixed turning position. The axial displacement of member 27 is then double the depth of the waves of path 91; and the turning displacement of the cage is half that of element 33'. Reciprocation is at a uniform rate, in direct proportion to the turning motion of element 33', during most of the motion in one direction that corresponds to the roller position shown in FIG. 8. This is shown by the straight portions of path 91. It is the working stroke.

The return stroke is tied up with the turning motion of the index plate, FIG. 4. We consider the imagined limit case where the worm thread is kept in working engagement at all time, also during the return stroke. Then the axial return displacement from the extended straight portion of path 91 should be equal to the product of the lead L of the worm thread multiplied by the proportion of the turning angle of the index plate to a full turn. To achieve no load at the very ends of the working stroke and during the return, the axial backward displacement is there somewhat increased over the limit amount.

FIG. 9 is a cylindrical development, like FIG. 8, showing wavy portions 92 rigid with element 33' and wavy portions 93 rigid with member 27' in direct sliding engagement with one another. The straight portions 92', 93' shown in engagement provide uniform motion, the same motion as achieved by the sides 37', 38' of FIG. 8. The curved portions engage each other during the return. Here also a slight modification from the limit shape is made as described.

The direct sliding contact requires half the number of waves to produce the same reciprocations. Thus, if for instance six rollers are used on the circumference, six cooperating waves (FIGS. 7 and 8) are required on each race, but only three waves (FIG. 9) are required for direct sliding contact. The roller engagement with six waves produces three reciprocations per turn of the rotary element 33', as do the three waves in direct contact.

Rolling contact

Because of the inclined relative path the rollers 40' (FIG. 8) contact their ways 37', 38' at points 94, 94' offset from the axial plane that contains the roller axis 89. If the cage holds the rollers in a fixed axial position, the contact point 94 of the roller moves about the roller axis in a direction 94–95, looking at the motion with fixed roller axes. Contact point 94 of the way moves in a direction 94–95' about axis 88. The two directions are inclined to each other and cause sliding in direction 95–95'. When motion is in the direction shown the friction tends to push the roller outwardly. This applies also to contact point 94'. The roller is being pushed against the cage, resulting in more friction.

I attain rolling contact without sliding by letting the rollers move axially. With tapered rollers 40' guide surfaces are required to control the axial roller position. Roller 40' (FIG. 10) has a spherical end surface 96 centered at 97, with which it bears against a rim 98 provided on the ways. The bearing surface of the rim is arranged at a slight spiral, as seen in FIG. 7. It will now be shown how this guide curve and the best taper of the rollers may be determined.

Let $e$ denote the offset of the contact point 94 from the plane laid through the roller axis and the axis 88 of the ways, let A be the distance from axis 88 of the plane perpendicular to the roller axis that contains line 94–95 (FIG. 7), and let $r'$ denote the elevation of point 94 over the roller axis 89, as measured in the direction of axis 88 (FIG. 8). It is almost equal to the roller radius.

To achieve pure rolling, the roller velocity component $v=94-95$ of point 94, as it appears in FIG. 7, should equal the velocity component 94–95 of the way. The velocity components ($v'$) in the direction of axis 88 should also be the same. And the velocity component $v''=95-95'$ of the way should be matched by an equal axial roller motion.

The velocity component $v'$ is $$\frac{L}{2\pi} \cdot \frac{v}{A}$$

where L denotes the lead of the relative helical displacement of the way and the roller axis. It must be equal to the component $v'$ of the roller velocity, which is $$\frac{v}{r'} \cdot e$$

as can be demonstrated mathematically. Hence $$e = \frac{r'}{A} \cdot \frac{L}{2\pi}$$

$e$ is constant at all different distances A if $r'/A$ is constant, that is, if the roller profile in offset plane 99 is a straight line 100 (FIG. 10), that passes through point 88'. It includes an angle $a$ with the direction of the roller axis 89. The roller surface is then a hyperboloid of revolution.

The velocity component $v''=95-95'$ amounts to $$v'' = \frac{v}{A} \cdot e$$

$v/A$ is constant at all distances A. It is the angular velocity about axis 88. Hence $v''$ is also constant if $e$ is constant. Then $r'/A$ is constant. $r'/A$ represents the trigonometric tangent of the angle $a$, tan $a$, as it appears in FIG. 10.

To achieve pure rolling the radial lead along the roller axis should be $L$ tan $a$ for the portion corresponding to any lead L. For the proportion of $v''/v'$ is tan $a$.

When the inclination of the roller profile 100 differs from angle $a$, pure rolling is still retained at the mean distance A when the roller has the described axial displacement.

FIG. 10 also illustrates the shape of the ways as modified by the radial roller displacement. The surface portion corresponding to a lead displacement L can be described by line 100 by displacing this line as the way turns on its axis 88. Line 100 moves along axis 88 in proportion to lead L to a position 100' and simultaneously in the direction of the roller axis in proportion to $L$ tan $a$ to a final position 100''. The total displacement of line 100 is seen to be larger than would correspond to lead L alone, so that the ways have a larger inclination or lead angle than the path of the roller axis.

The described roller surface differs very little from a conical surface at the small leads generally used. A conical surface may be conveniently substituted therefor.

The side surfaces of the wavy ways and their rim can be produced with a milling cutter or grinding wheel of the same size and shape as the roller, by imparting the same relative displacements thereto as gone through by the roller.

Roller 40' may contain pin-like cylindrical projections 101 that engage slots provided in the cage member 45'.

FIG. 11 shows a disposition with cylindrical rollers 110. They are held by a cage 111 shown fragmentarily. Each slot of the cage contains two rollers of moderate length, to improve rolling, whereby the outer roller turns most. The lower portion of FIG. 11 shows the rollers in the same mean position as the rollers 40' of FIGS. 7 and 8. At the upper right a roller pair is shown at the end of the working stroke, with both rollers in their outmost position, in contact with the end of the cage slot and with each other. At the upper left the two rollers are shown at the start of the working stroke. The inner roller has the most axial displacement and is now in contact with the inner end of the slot. The slot ends keep the rollers sufficiently in place axially. No guiding rims are here required. Pure rolling is attained near the middle of each roller by keeping it free to move axially. However the overall rolling action is less perfect than with tapered rollers.

Modifications may be made in my invention without departing from its spirit. For definition of its scope it is relied on the appended claims.

I claim:

1. A reduction drive comprising a plurality of rotatable and axially reciprocable parts having helical threads, a driven member engaging said threads, a rotary driver, means for periodically rotatably indexing said parts at staggered intervals about the axes of their respective threads, a member connected to each part to partake in its axial bodily motion but not in its indexing, means for reciprocating each of the second-named members and its part along the thread axis of said part, said reciprocating means comprising an axially fixed rotary element coaxial with said part and receiving motion from said driver, said element having undulating side surfaces on opposite sides, said second-named members having undulatory side surfaces mating with the first-named undulatory surfaces, and rollers disposed between at least one of said opposite sides and the mating side surface of the associated second-named member.

2. A reduction drive according to claim 1, wherein the other mating undulatory surfaces engage each other with direct sliding contact, the number of undulations engaged in sliding contact being half the number of undulations engaged through rollers.

3. A reduction drive according to claim 1, wherein said rotary element contains undulatory side surfaces facing away from each other, and wherein each said second-named member contains spaced undulatory side surfaces rigid therewith and straddling said element.

4. A reduction drive according to claim 3, wherein means are provided for rotatably mounting said element in an axially fixed position, said means being disposed axially between its wavy side surfaces that face away from each other.

5. A reduction drive according to claim 1, wherein the parts having helical threads are two cylindrical worms having angularly disposed and intersecting axes, and the driven member is a wormgear with which the helical threads of both said worms mesh.

6. A reduction drive according to claim 1, wherein the parts having helical threads are two coaxial nuts, said nuts engaging a screw that is axially movable and angularly stationary and that constitutes the driven member.

7. A reduction drive according to claim 1, wherein said reciprocating means comprises said rotary element and an angularly stationary part having undulatory side surfaces facing each other, rollers interposed between said side surfaces in contact therewith, a cage member for spacing and positioning said rollers, and means permitting said rollers to move axially as they roll, to improve their rolling contact.

8. A reduction drive according to claim 7, wherein the undulatory side surfaces are shaped to effect axial displacement in direct proportion to the turning angle of said rotary element through a portion of the cycle, said rollers are tapered, and guide surfaces are formed rigid with at least one of the two mating surfaces, for guiding the axial displacement of the rollers.

9. A reduction drive according to claim 8, wherein the surface for guiding the axial displacement of a roller contacts the outer end surface of said roller.

10. A reduction drive according to claim 9, wherein each of said tapered rollers has a convex spherical end surface centered between said end surface and the intersection of the roller axis with the bearing axis.

11. A reduction drive according to claim 7, wherein the undulatory side surfaces are shaped to provide a displacement in direct proportion of the turning angle of said rotary part through a portion of each cycle, cylindrical rollers are spaced about said axis by slots provided in said cage member, each slot containing a plurality of coaxial rollers of the same diameter, and the length of said slot exceeds the aggregate axial length of the rollers therein by the required axial displacement of the iinnermost roller, at least approximately.

No references cited.

HENRY F. RADUAZO, *Primary Examiner.*

DONLEY J. STOCKING, *Examiner.*

L. H. GERIN, *Assistant Examiner.*